April 11, 1950     C. E. JOHANNINGMEIER     2,503,440
MEASURING TAPE WITH STOP
Filed July 24, 1946
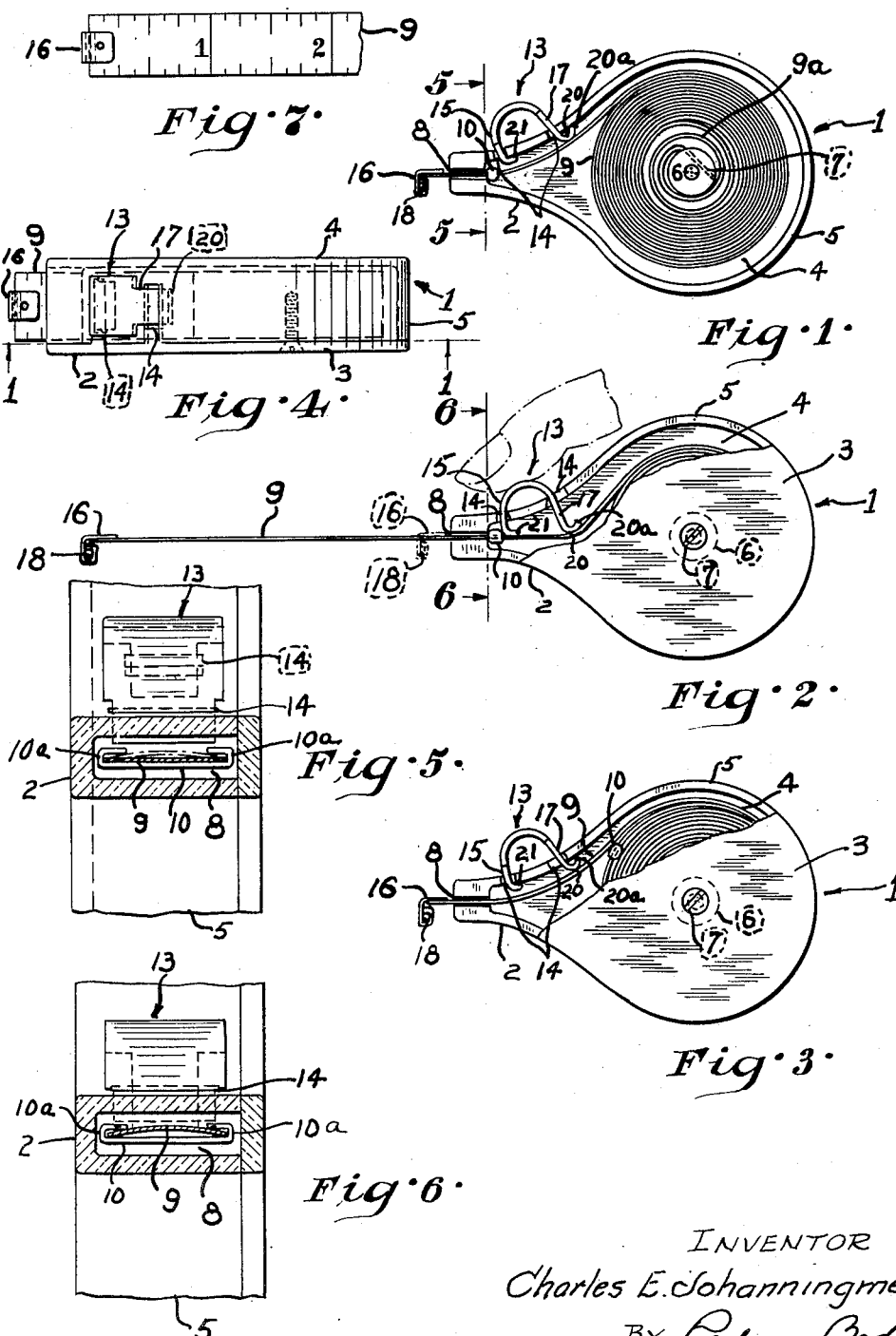
INVENTOR
Charles E. Johanningmeier
BY Rodney Bedell
ATTORNEY Patented Apr. 11, 1950

2,503,440

UNITED STATES PATENT OFFICE 2,503,440

MEASURING TAPE WITH STOP

Charles E. Johanningmeier, St. Louis, Mo.

Application July 24, 1946, Serial No. 685,847

6 Claims. (Cl. 242—84.9)

The invention relates to measuring devices and more particularly to measuring tapes which retract into a housing.

One object of the invention is to provide a measuring tape which may be withdrawn any desired length from a housing, then after the tape has been retracted into the housing and is again withdrawn, the tape is checked automatically when it reaches the previous extension.

This is accomplished by providing a stop within the housing and on the tape in frictional engagement therewith. The stop may be adjusted on the tape to any desired position and when the tape is withdrawn from the housing, the stop automatically limits the successive extensions of the tape to the preceding extension until the stop is readjusted to a new position.

This and other detail objects are attained by the structure illustrated in the accompanying drawings, in which:

Figure 1 is a horizontal section taken approximately on line 1—1 of Figure 4 showing a device constructed according to the invention, the tape being retracted wholly within the housing.

Figure 2 is a top view of the device with a portion of the housing cover cut away and showing the tape partially withdrawn and with the stop being adjusted.

Figure 3 is a view similar to Figure 2 showing the tape wholly retracted within the container and with the stop adjusted to the position of Figure 2.

Figure 4 is a side view of the device.

Figures 5 and 6 are transverse vertical sections taken approximately on line 5—5 of Figure 1 and line 6—6 of Figure 2, respectively, and drawn to an enlarged scale.

Figure 7 shows a portion of the measuring tape.

The device comprises a substantially circular housing 1 having a protruding neck 2. The housing comprises substantially circular flat bottom and top walls 3 and 4 and an arcuate side wall 5 positioned therebetween. A spool 6 slotted at 7 is attached rigidly between bottom and top walls 3 and 4, and is positioned substantially centrally of circular housing 1. In the end of neck 2 is a transverse elongated aperture 8 extending the entire width of side wall 5. A flexible metal measuring tape 9, provided with suitable indicia, is arranged to coil on and uncoil from spool 6 as the tape is retracted into and withdrawn from housing 1 through aperture 8. Tape 9 preferably is formed integral with a flat coiled spring 9a having its inner end secured in slot 7 of spool 6. When tape 9 is withdrawn from the housing through aperture 8, spring 9a coils tightly on spool 6, and when tape 9 is pushed manually through aperture 8 into housing 1, spring 9a uncoils loosely on spool 6 and winds tape 9 thereon. The tape preferably reverses its direction of curvature as it passes from the coil to aperture 8.

The tape is of familiar construction, characterized by being concavo-convex in cross section when straight (Figure 6) and therefore is stiff, or self-supporting for a substantial distance. When coiled or otherwise bent into an arc, the tape flattens transversely and its overall width is increased (Figure 5). The tape preferably is coiled on spool 6 with the concave face inwardly of the coil.

A bracket 16, larger than aperture 8 and attached to the outer end of tape 9, prevents the outer end of the tape retracting into the housing. Bracket 16 may have an opening 18 to receive the point of a pencil to facilitate laying out measurements or to draw circles of large diameter.

A stop 10 is mounted within housing 1 transversely on tape 9 and has its ends doubled back about the edges of the tape to form ears 10a in frictional engagement therewith. Stop 10 is slidable longitudinally on tape 9 when the tape is straight longitudinally and the tape is concavo-convex transversely (Figure 6). Stop 10 locks frictionally on the tape when the tape is curved longitudinally and the tape is flat transversely and therefore is widened and its edges engage ears 10a (Figure 5).

Stop 10 is larger than aperture 8 and cannot pass therethrough. Normally the entire length of tape 9 within housing 1 is curved and stop 10 is held frictionally in adjusted position and limits further withdrawal of tape 9 when the stop reaches aperture 8.

Stop 10 may be adjusted to any desired position by manually pressing a U-shaped clip 13, extending through openings 14 in side wall 5, into engagement with tape 9, as shown in Figure 2, and withdrawing or retracting tape 9 to any desired length. With clip 13 in this position, the portion of tape 9 adjacent aperture 8 is held substantially straight longitudinally so that stop 10 may slide thereon. With stop 10 positioned adjacent aperture 8, when the tape is further withdrawn from housing 1 the stop engages the sides of aperture 8, and when the tape is retracted into housing 1, the stop engages a leg 15 of clip 13 and slides along the tape to a new position. A leg 17 of clip 13 has an arcuate end 20 normally engaging tape 9 (Figures 1 and 3), the extreme tip 20a of leg 17 pivoting on the housing side wall at a point spaced from the tape engaging part of the clip, thus thrusting the major portion of clip 13 outwardly of the housing to the extent limited by the tab 21 on the other leg 15 of the clip.

With clip 13 depressed as shown in Figure 2, tape 9 may be withdrawn any desired length from housing 1 and the clip is then released. When the tape is subsequently retracted into housing 1 and is again withdrawn, the tape is checked automatically when it reaches the previous extension.

Obviously it is not essential that all details of construction be present in every embodiment of the invention and the details may be varied without departing from the spirit of the invention. The exclusive use of modifications coming within the scope of the claims is contemplated.

What is claimed is:

1. A measuring device comprising a housing having an aperture, a flexible tape arranged for withdrawal from and retraction into said housing through said aperture, an element within said housing and on said tape in frictional engagement therewith, said element being larger than said aperture so that when said tape is withdrawn from said housing and said element reaches said aperture, further withdrawal of said tape from said housing is automatically limited, and a manually operated clip adapted to engage said element and to shift said element on said tape to a desired position when said tape is retracted into said housing.

2. A measuring device comprising a housing having an aperture, a flexible tape arranged for withdrawal from and retraction into said housing through said aperture, an element within said housing and on said tape in frictional engagement therewith, said element being larger than said aperture so that when said tape is withdrawn from said housing and said element reaches said aperture, further withdrawal of said tape from said housing is automatically limited, and a manually operated clip adapted to engage said element and to shift said element to a desired position when said tape is retracted into said housing, and to permit said element to slide on said tape when said element engages the boundaries of said aperture so that said tape may be withdrawn further from said housing.

3. A measuring device comprising a housing having an aperture, a flexible tape arranged for withdrawal from and retraction into said housing through said aperture and having opposite faces concavo-convex transversely thereof when said tape is straight longitudinally, said faces being substantially flat transversely and the overall width of said tape increasing when said tape is curved longitudinally, said tape being arranged to wind into a coil when retracted into said housing, an element within said housing in frictional engagement with said tape and slidable thereon, frictional engagement of said element with said tape being greater when said tape is curved longitudinally and said faces are flat, said element being larger than said aperture so that when said tape is withdrawn from said housing and said element reaches said aperture, further withdrawal of said tape is automatically limited, and means to hold said tape adjacent said aperture straight longitudinally and concavo-convex transversely so that said element can be readily shifted on said tape as said tape is withdrawn from or retracted into said housing.

4. A measuring device comprising a housing having an aperture, a flexible metal tape normally coiled in the housing and arranged to be withdrawn from and retracted through said aperture, a member mounted on the housing to be moved manually in one direction transversely of the tape and engage the latter at a point adjacent said aperture and position said tape in line therewith, said member being moved in the opposite direction by the thrust of the tape when manual pressure on the member is released, and an element slidable on the tape and normally frictionally engaging the tape to limit withdrawal of the tape through said aperture, said element being slidable on said tape when said member is held manually in its first-mentioned position and said element is between said member and aperture.

5. A measuring device comprising a housing, a flexible tape normally coiled in the housing and arranged for withdrawal from and retraction into said housing, an element within said housing and on said tape normally in frictional engagement therewith to limit withdrawal of said tape from said housing, a U-shaped member arranged to be pushed manually inwardly of said housing with both of its legs engaging and holding said tape in a position so that said element may slide on said tape, one leg of said member engaging said element as said tape is retracted into said housing and sliding said element on said tape, said member when manually released being movable outwardly of said housing by said tape and pivoting about its other leg so that said first-mentioned leg disengages said tape and said element.

6. A measuring device comprising a housing having an aperture, a flexible tape arranged for withdrawal from and retraction into said housing through said aperture, an element within said housing and on said tape in frictional engagement therewith when said tape is arcuate longitudinally to limit withdrawal of said tape from said housing, said tape inside said housing normally being arcuate, and a clip extending into said housing and adapted to be moved manually to hold said tape adjacent said aperture substantially straight longitudinally so that said element when positioned adjacent said aperture may slide on said tape to a new position as said tape is withdrawn from or retracted into said housing.

CHARLES E. JOHANNINGMEIER.

REFERENCES CITED

The following references are of record in the file of this patent:

UNITED STATES PATENTS

| Number | Name | Date |
| --- | --- | --- |
| 154,204 | Wild | Aug. 18, 1874 |
| 1,975,419 | Grube | Oct. 2, 1934 |
| 2,410,713 | Carlson | Nov. 5, 1940 |